United States Patent
Hansen et al.

(10) Patent No.: US 10,106,105 B2
(45) Date of Patent: Oct. 23, 2018

(54) CUP HOLDER ASSEMBLY

(71) Applicant: SHANGHAI YANFENG JINQIAO AUTOMOTIVE TRIM SYSTEMS CO. LTD., Shanghai (CN)

(72) Inventors: Scott Allen Hansen, Holland, MI (US); Ronald A. Bozio, Holland, MI (US)

(73) Assignee: SHANGHAI YANFENG JINQIAO AUTOMOTIVE TRIM SYSTEMS CO., LTD., Shanghai (CN)

( * ) Notice: Subject to any disclaimer, the term of this patent is extended or adjusted under 35 U.S.C. 154(b) by 35 days.

(21) Appl. No.: 14/782,147

(22) PCT Filed: Apr. 2, 2014

(86) PCT No.: PCT/US2014/032688
§ 371 (c)(1),
(2) Date: Oct. 2, 2015

(87) PCT Pub. No.: WO2014/165597
PCT Pub. Date: Oct. 9, 2014

(65) Prior Publication Data
US 2016/0046233 A1    Feb. 18, 2016

Related U.S. Application Data

(60) Provisional application No. 61/807,575, filed on Apr. 2, 2013.

(51) Int. Cl.
*B60R 13/07*    (2006.01)
*B60N 3/10*    (2006.01)
(Continued)

(52) U.S. Cl.
CPC .............. *B60R 13/07* (2013.01); *B60N 3/101* (2013.01); *B60Q 3/20* (2017.02); *B60Q 3/64* (2017.02); *B60Q 3/66* (2017.02)

(58) Field of Classification Search
CPC ................................................... B60Q 3/0243
See application file for complete search history.

(56) References Cited

U.S. PATENT DOCUMENTS 2,745,947 A * 5/1956 Sansous ............. A47G 23/0309
                                          362/101
4,681,219 A * 7/1987 Kitchens ................ A01K 97/06
                                          206/315.11
(Continued)

FOREIGN PATENT DOCUMENTS

JP    2002120630 A    4/2002
WO    2008133903        11/2008
(Continued)

OTHER PUBLICATIONS

PCT Invitation to Pay Additional Fees dated Aug. 19, 2014.
(Continued)

*Primary Examiner* — Anh Mai
*Assistant Examiner* — Zachary J Snyder
(74) *Attorney, Agent, or Firm* — Amin, Turocy & Watson, LLP

(57) ABSTRACT

A receptacle for a vehicle interior is configured to provide light from a light source. The receptacle includes a base, a wall extending from the base to form an opening and providing an outlet into the opening, a guide for transmitting light along the base, and a guide for transmitting light along the wall. When light is provided beneath the base by the light source, light is transmitted through the guide along the base and into the guide along the wall.

20 Claims, 8 Drawing Sheets

(51) Int. Cl.
  *B60Q 3/64* (2017.01)
  *B60Q 3/66* (2017.01)
  *B60Q 3/20* (2017.01)

(56) References Cited

U.S. PATENT DOCUMENTS

| | | | | |
|---|---|---|---|---|
| 4,886,183 | A * | 12/1989 | Fleming | A47G 23/0266 206/459.1 |
| 5,307,250 | A * | 4/1994 | Pearson | A47G 23/0309 248/346.11 |
| 6,092,905 | A * | 7/2000 | Koehn | A47G 23/0216 362/101 |
| 6,164,793 | A * | 12/2000 | Wu | A47G 19/2227 362/101 |
| 6,443,589 | B1 * | 9/2002 | Lee | A47G 19/2227 362/101 |
| 6,591,524 | B1 * | 7/2003 | Lewis | A47G 19/2227 310/339 |
| 6,619,811 | B2 * | 9/2003 | Wang | A47G 19/2227 362/101 |
| 6,923,549 | B2 * | 8/2005 | Hoy | A47G 19/2227 362/101 |
| 7,229,196 | B2 * | 6/2007 | Hulse | G02B 19/0071 362/23.01 |
| 7,232,237 | B2 * | 6/2007 | Bigger | A47G 23/0216 362/101 |
| 7,419,072 | B1 * | 9/2008 | Vanella | A47G 23/0309 222/113 |
| 7,500,443 | B1 * | 3/2009 | Allen | B63B 29/06 114/343 |
| 8,459,821 | B1 * | 6/2013 | Fusilier | A47G 23/0309 362/101 |
| 8,579,459 | B2 * | 11/2013 | Ma | A45C 3/00 362/156 |
| 9,493,102 | B2 | 11/2016 | Tang | |
| 2003/0076672 | A1 * | 4/2003 | Head | A47G 23/0309 362/101 |
| 2004/0017678 | A1 * | 1/2004 | Liu | A47G 19/2227 362/101 |
| 2004/0114352 | A1 * | 6/2004 | Jensen | A47G 23/0309 362/101 |
| 2008/0266853 | A1 | 10/2008 | Goto | |
| 2010/0124048 | A1 * | 5/2010 | Winters | F21V 33/0024 362/101 |
| 2010/0195861 | A1 * | 8/2010 | King | F21V 33/0056 381/396 |
| 2011/0037287 | A1 | 2/2011 | Penner | |
| 2011/0235354 | A1 | 9/2011 | Glazier | |
| 2012/0075842 | A1 * | 3/2012 | Goto | B60N 3/101 362/154 |
| 2012/0217772 | A1 | 8/2012 | Tang | |

FOREIGN PATENT DOCUMENTS

| | | |
|---|---|---|
| WO | 2008133903 A1 | 11/2008 |
| WO | 2012039746 | 3/2012 |

OTHER PUBLICATIONS

PCT International Search Report and Written Opinion dated Nov. 4, 2014.
Office action dated Oct. 9, 2016 from the State Intellectual Property Office (SIPO/China) for CN Application No. 201480031494.8.
Contents of EPO Global Dossier for EP Publication No. EP 2981435 A2 (EP Application No. 20140723613) at European Patent Register (https://register.epo.org/application?number=EP14723613&Ing=en&tab=doclist) (accessed on Feb. 28, 2018) (211 pages).
Contents of EPO Global Dossier for Chinese Patent Application No. CN201480031494 (Translated materials) at European Patent Register (https://register.epo.org/ipfwretrieve?apn=CN.201480031494.A&Ing=en) (accessed on Feb. 28, 2018) (12 pages).

* cited by examiner

CUP HOLDER ASSEMBLY

CROSS REFERENCE TO RELATED APPLICATION

This application is a national stage of PCT Application No. PCT/US2014/032688, entitled "ILLUMINATED CUP HOLDER ASSEMBLY", filed on Apr. 2, 2014, which claims priority from and the benefit of U.S. Provisional Application Ser. No. 61/807,575, entitled "ILLUMINATED CUP HOLDER ASSEMBLY", filed Apr. 2, 2013. Each of the listed applications is incorporated by reference in its entirety.

BACKGROUND

The invention relates generally to vehicle interior components, and more specifically, to an illuminated cup holder assembly.

Cup holders may be positioned throughout a vehicle interior for securing beverage containers. For example, the center console, armrests, door panels, or other interior structures of the vehicle may include one or more cup holders. Certain cup holder configurations include a recess disposed within the interior structure, and a liner inserted within the recess. The liner is configured to secure the beverage container within the recess, thereby limiting movement of the beverage container during vehicle operation. Typical cup holders may accommodate a variety of cups, cans, bottles, and the like.

Certain cup holders include ambient lighting to increase the visibility of the cup holder and/or the beverage container in dark conditions (e.g., while driving at night). For example, certain cup holders may include a lit ring extending about the circumference of the cup holder to enhance the visibility of the cup holder in dark conditions. The lit ring may be illuminated by multiple light sources distributed about the ring. However, the distributed light sources may cause the lit ring to emit light with varying intensities. For example, a region of the lit ring proximate to a light source may emit light with a greater intensity than a region remote from the light source. Accordingly, the aesthetic appearance of the cup holder may be reduced. In addition, providing multiple light sources, and their associated electrical circuits (e.g., circuit boards, driving components, etc.), may significantly increase the cost of the cup holder.

SUMMARY

The present invention relates to a receptacle for a vehicle interior is configured to provide light from a light source. The receptacle includes a base, a wall extending from the base to form an opening and providing an outlet into the opening, a guide for transmitting light along the base, and a guide for transmitting light along the wall. When light is provided beneath the base by the light source, light is transmitted through the guide along the base and into the guide along the wall.

The present invention relates to a receptacle for a vehicle interior is configured to contain liquid and provide illumination from an electronic component. The receptacle includes a base, a wall extending from the base to form a body configured to contain liquid, a channel beneath the base and configured to receive liquid from the body, and a drain providing a port for liquid from the channel. A flow path is provided so that liquid in the body is directed to flow to the drain through the channel and away from the electronic component.

The present invention relates to a receptacle for a vehicle interior is configured to contain liquid and provide light from a light source. The receptacle includes a base, a wall extending from the base to form a body configured to contain liquid, a channel beneath the base and configured to receive liquid from the body, a drain providing a port for liquid from the channel, a guide for transmitting light along the base, and a guide for transmitting light along the wall. A flow path is provided so that liquid in the body is directed to flow to the drain through the channel and away from the electronic component, and when light is provided beneath the base by the light source, light is transmitted through the guide along the base and into the guide along the wall.

DRAWINGS

DETAILED DESCRIPTION

Figure 1:
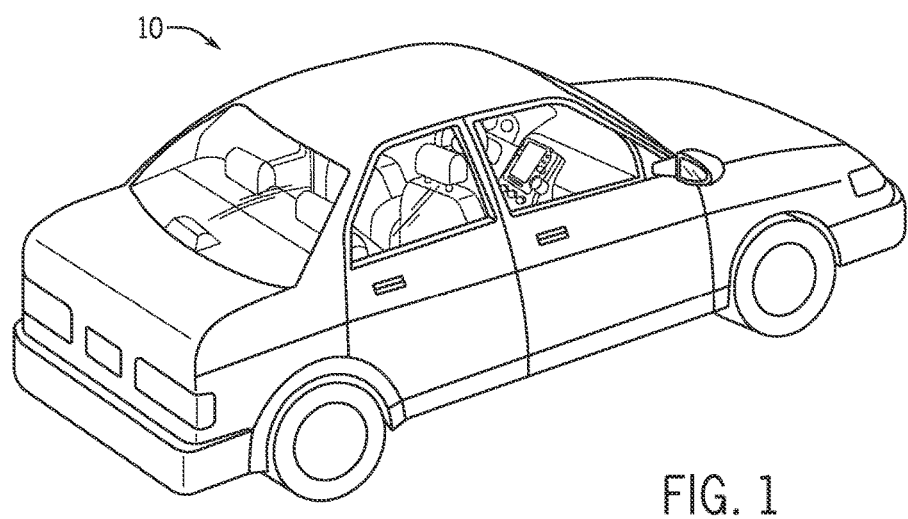
FIG. 1 is a perspective view of an exemplary vehicle that may include an illuminated cup holder assembly.

FIG. 1 is a perspective view of a motor vehicle 10 that may include an illuminated cup holder assembly. According to an exemplary embodiment, the vehicle 10 includes an interior having a seat, an armrest and a center console. According to an exemplary embodiment, the seat, armrest, center console and/or other areas within the interior may include cup holders configured to secure beverage containers. According to an exemplary embodiment, the cup holder assembly includes an illuminated ring configured to enhance the visibility of the cup holder in low light conditions (e.g., while driving at night). According to an exemplary embodiment, the cup holder assembly includes a cup holder body having a peripheral wall extending at least partially about a central opening of a receptacle. The cup holder assembly also includes a light transmissive element disposed within the central opening and forming a base of the receptacle. The light transmissive element is configured to receive light from a light source positioned proximate to a central portion of the light transmissive element, and to illuminate a surface of the light transmissive element proximate to the peripheral wall. For example, the surface may include a substantially annular ring extending about the base of the receptacle. The illuminated surface may enhance the visibility of the cup holder assembly in low light conditions (e.g., while driving at night). In addition, because the surface is illuminated by a single centrally-located light source, the luminous intensity of the surface may be substantially uniform. As a result, the aesthetic appearance of the cup holder may be enhanced.

According to an exemplary embodiment, the cup holder assembly includes a drain system configured to direct liquid away from electronic components positioned beneath the cup holder. According to an exemplary embodiment, the cup holder assembly includes a cup holder body having a peripheral wall extending at least partially about a central opening of a receptacle. The cup holder assembly also includes a support element disposed within the central opening and forming a base of the receptacle. In addition, the cup holder assembly includes a substrate configured to support the cup holder body and the support element. The substrate includes a central section proximate to the support element and a drain system configured to direct a liquid flow from an interface between the cup holder body and the support element to a region remote from the central section. For example, the central section may include electronic components, such as a light source for an illuminated surface of the cup holder assembly. In such a configuration, the drain system directs liquid (e.g., from a beverage container within the receptacle) away from the electronic components, thereby enhancing the longevity of the components.

According to an exemplary embodiment, the cup holder assembly includes a light transmissive liner configured to retain a beverage container and to facilitate illumination of the receptacle. According to an exemplary embodiment, the cup holder assembly includes a receptacle configured to receive a beverage container. The cup holder assembly also includes a liner disposed within the receptacle. The liner is formed from a light transmissive material configured to receive light from a light source positioned outwardly from an outer surface of the liner, and to illuminate an inner surface of the liner. The illuminated liner may enhance the visibility of the cup holder assembly in low light conditions (e.g., while driving at night). In addition, the liner may conceal the lighting system until activated, thereby enhancing the aesthetic appearance of the cup holder assembly (e.g., while the lighting system is not activated).

Figure 2:
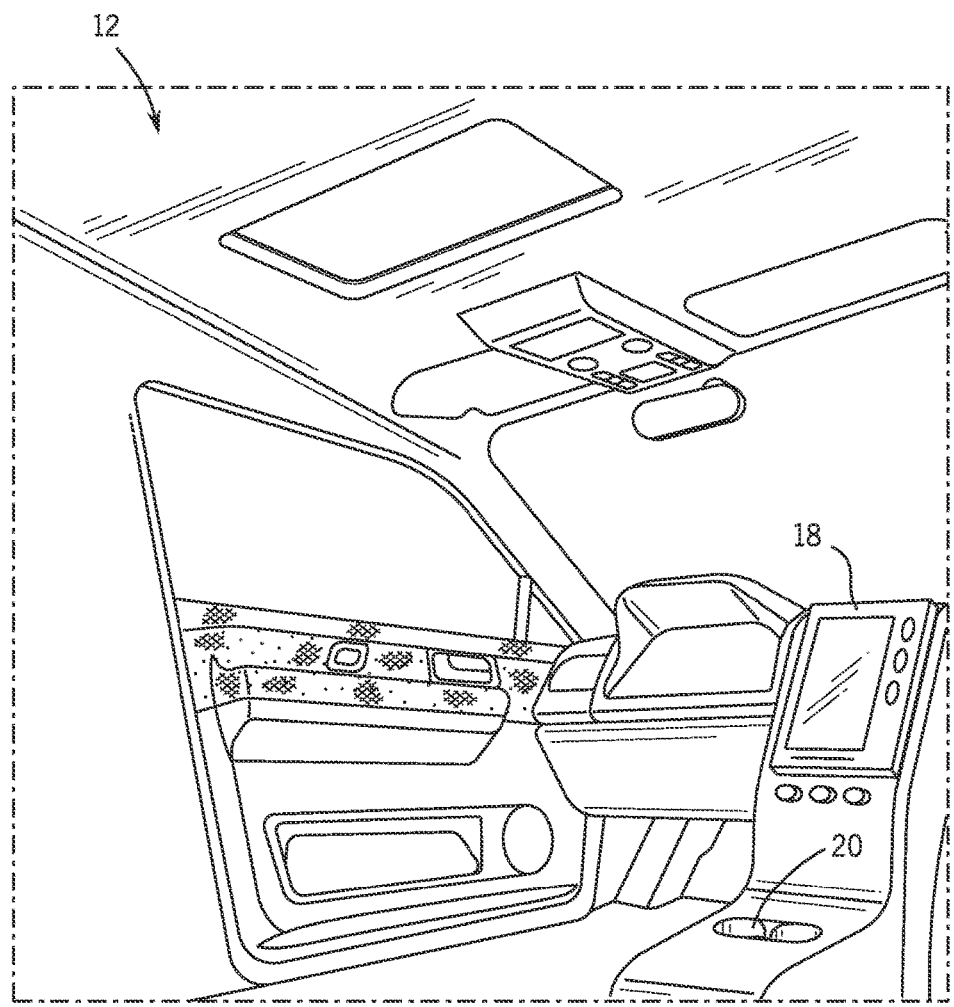
FIG. 2 is a perspective view of a part of the interior of the vehicle of FIG. 1.

FIG. 2 is a perspective view of a part of the interior 12 of the vehicle 10 of FIG. 1. According to an exemplary embodiment, the vehicle interior 12 includes the center console 18 having a cup holder assembly (e.g., component) 20. As previously discussed, cup holders may be positioned throughout the interior 12 of the vehicle 10. For example, cup holders may be positioned within an interior door panel, an armrest, or within the seats. According to an exemplary embodiment, the cup holder assembly 20 includes a light transmissive element configured to receive light from a single light source and to illuminate a surface of the light transmissive element proximate to a peripheral wall of a cup holder receptacle. The light emitted from the surface of the light transmissive element facilitates identification of the cup holder in low light conditions (e.g., while driving at night).

Figure 3:
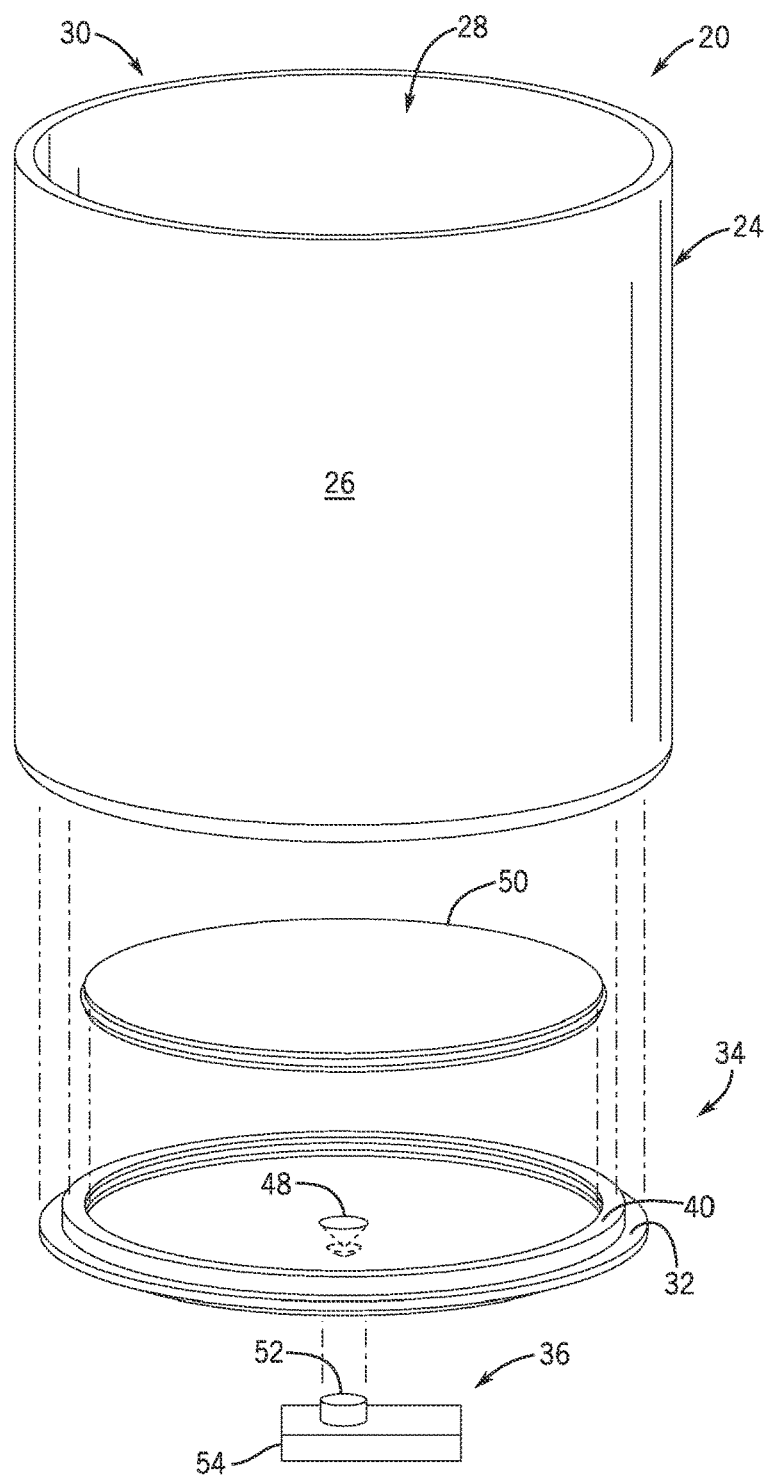
FIG. 3 is an exploded perspective view of an embodiment of a cup holder assembly having a lighting system configured to illuminate a portion of the cup holder assembly.

FIG. 3 is an exploded perspective view of an embodiment of a cup holder assembly 20 having a lighting system configured to illuminate a portion of the cup holder assembly. According to an exemplary embodiment, the cup holder assembly 20 includes a cup holder body 24 having a peripheral wall 26 extending about a central opening 28 of a receptacle 30. The receptacle 30 is configured to receive a beverage container, and to secure the beverage container within the cup holder assembly 20 during operation of the vehicle. For example, a liner may be disposed within the receptacle 30 to block movement of the beverage container via frictional contact with an outer surface of the beverage container. In certain configurations, the liner may include protrusions configured to deform to accommodate various beverage container diameters. Alternatively, the receptacle 30 may include movable (e.g., rotatable) fingers that are biased radially inward to block movement of the beverage container via contact with the outer surface of the beverage container.

According to an exemplary embodiment, the cup holder assembly 20 also includes a light transmissive element 32 disposed within the central opening 28 and forming a base 34 of the receptacle 30. According to an exemplary embodiment, the light transmissive element 32 may be secured to the cup holder body 24 and configured to support the beverage container during operation of the vehicle. The light transmissive element 32 is also configured to receive light from a light source 36 positioned proximate to a central portion of the light transmissive element 32, and to illuminate a surface (e.g., ring) 40 of the light transmissive element 32 proximate to the peripheral wall 26. The illuminated surface may enhance the visibility of the cup holder assembly 20 in low light conditions (e.g., while driving at night). In addition, because the surface 40 is illuminated by a single centrally-located light source 36, the luminous intensity of the surface may be substantially uniform. As a result, the aesthetic appearance of the cup holder may be enhanced.

According to an exemplary embodiment, the surface 40 forms a substantially annular ring extending about the base 34 of the receptacle 30 along a circumferential direction. However, it should be appreciated that the surface 40 may be shaped to match the contours of the base 34 of the receptacle 30. According to an exemplary embodiment, the receptacle base 34 may have a polygonal, elliptical, or asymmetrical shape. Accordingly, the surface 40 may have a corresponding shape. Furthermore, it should be appreciated that the light transmissive element may be formed from any suitable light transmissive material, such as glass or plastic (e.g., polycarbonate, acrylic, etc.). In addition, the light transmissive material may be substantially clear or tinted to provide a desired color to the illuminated surface.

According to an exemplary embodiment, the light source 36 is configured to emit light in a vertical direction toward the central portion of the light transmissive element 32. The light transmissive element 32, in turn, is configured to redirect the light outwardly in a radial direction toward the surface 40, thereby illuminating the surface 40. According to an exemplary embodiment, the light transmissive element 32 includes an integrated light directing device (e.g., lens) 48 configured to receive the light from the light source 36 and to direct the light through the central portion. According to an exemplary embodiment, the light directing device 48 may include a substantially conical protrusion extending from a bottom surface of the light transmissive element 32, or a combination of a lens and angled surfaces configured to collimate and redirect the light, respectively.

According to an exemplary embodiment, the cup holder assembly 20 includes a shield (e.g., plate) 50 configured to block at least a portion of the light from the central portion into the receptacle. For example, the shield may be formed from a substantially opaque material (e.g., thermoplastic elastomer (TPE), polycarbonate (PC), acrylonitrile butadiene styrene (ABS), polyurethane (PE) foam, etc.), thereby blocking light from the central portion. As a result, the light emitted from the surface 40 may form an illuminated ring extending about a circumference of the receptacle 30. According to an exemplary embodiment, the shield 50 may be formed from a material that enables a portion of the light from the center portion to pass through the shield, thereby establishing various lighting effects. For example, the shield 50 may include alternating regions of substantially opaque and light transmissive material to establish a desired lighting pattern at the base 34 of the receptacle 30.

According to an exemplary embodiment, the light source 36 includes a light emitting element (e.g., light) 52 and a circuit assembly 54. The circuit assembly 54 may include a circuit board and associated electronic components configured to drive the light emitting element to emit light. The light emitting element 52 may be any suitable device configured to emit sufficient light to illuminate the light transmissive element, such as a light emitting diode (LED), incandescent bulb, or a fluorescent bulb, for example. According to an exemplary embodiment, a single light emitting element 52 may be employed to illuminate the surface 40 of the light transmissive element 32. Alternatively, multiple light emitting elements 52 (e.g., LEDs) may be directed toward the central portion of the light transmissive element 32 to illuminate the surface 40. According to an exemplary embodiment, the light emitting elements 52 may be selected to have substantially similar colors and/or intensities (e.g., selected from the same bin). Consequently, the illuminated surface 40 may emit light with a desired color and/or intensity.

According to an exemplary embodiment, the circuit assembly 54 may be configured to vary the intensity, frequency, and/or color of the light emitted by the light emitting element 52. For example, the light source 36 may include a tricolor LED configured to emit a variety of colors via a combination of red, green and blue color elements. In such a configuration, a color of the illuminated surface 40 may be particularly adjusted based on user input, for example. Furthermore, the circuit assembly 54 may include a dimming feature to adjust lighting intensity, and/or voltage conditioning elements to provide a desired voltage to the light emitting element 52.

According to an exemplary embodiment, the cup holder assembly 20 may include a sensor communicatively coupled to the circuit assembly 54. The sensor is configured to output a signal indicative of presence of an activating object, temperature of the activating object and/or ambient temperature. The circuit assembly, in turn, is configured to adjust a color, intensity, and/or frequency of the light emitted from the light emitting element based on the signal. For example, the sensor may be a thermocouple disposed within the receptacle. The sensor outputs a signal indicative of a beverage container temperature to the circuit assembly. The circuit assembly then adjusts the color emitted by the light emitting element based on the detected temperature. For example, if a cold beverage is placed within the cup holder receptacle, the illuminated surface may emit blue light, and if a hot beverage is placed within the cup holder receptacle, the illuminated surface may emit red light. Similarly, the color of the light emitted by the light emitting element may be adjusted based on a detected ambient temperature within the vehicle interior. According to an exemplary embodiment, the cup holder assembly 20 is configured to actively heat or cool the beverage container (e.g., by directing heated or cooled air from the HVAC system to the cup holder assembly 20). The circuit assembly may instruct the light emitting element to emit red light if the beverage container is being actively heated, and to emit blue light if the beverage container is being actively cooled.

The sensor may also be configured to detect the presence of an activating object (e.g., keys, sunglasses, coins, food/beverage containers, etc.) within the cup holder assembly 20. If the object is detected, the circuit assembly instructs the light emitting element to decrease luminous intensity or completely darken. In this manner, light reflected from the object within the cup holder may be significantly reduced or eliminated. Furthermore, once the sensor has detected that the object has been removed from the cup holder, the circuit assembly instructs the light emitting element to return to the initial illuminated state, thereby facilitating identification of the cup holder assembly in low light situations. According to an exemplary embodiment, the circuit assembly may be configured to instruct the light emitting element to increase luminous intensity, vary the color, and/or vary the frequency of the emitted light upon detection of an activating object.

According to an exemplary embodiment, the light transmissive element 32 includes a top (e.g., first side) facing the receptacle 30 and a bottom (e.g., second side), opposite the top. As previously discussed, the top of the light transmissive assembly 32 is configured to support a beverage container within the receptacle 30 during operation of the vehicle. According to an exemplary embodiment, the light transmissive element 32 is configured to block liquid flow from the top to the bottom. For example, the light transmissive element may be formed from a substantially liquid-tight material, such as glass or plastic (e.g., polycarbonate, acrylic, etc.). Accordingly, the light transmissive element 32 substantially blocks liquid flow through the base 34 of the receptacle 30. Because the light source 36 is positioned adjacent to the bottom of the light transmissive element 32 (e.g., beneath the base 34 of the receptacle 30), the possibility of contact between liquid (e.g., from a beverage container within the receptacle) and the light source 36 is substantially reduced or eliminated. As a result, the longevity of the light source 36 may be significantly enhanced.

Figure 4:
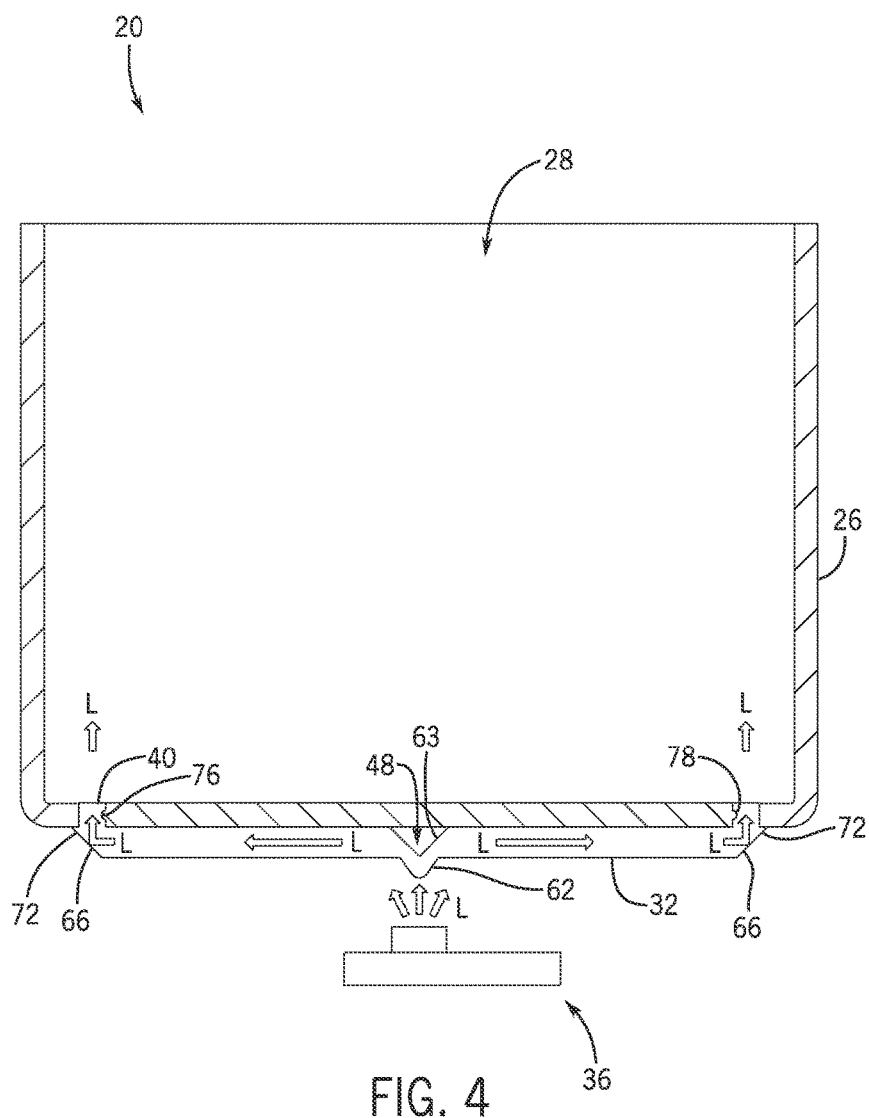
FIG. 4 is a cross-sectional view of the cup holder assembly of FIG. 3.

FIG. 4 is a cross-sectional view of the cup holder assembly 20 of FIG. 3. As previously discussed, the light transmissive element 32 is configured to receive light from the light source 36 and to illuminate the surface 40 proximate to the peripheral wall 26 of the cup holder body. According to an exemplary embodiment, the light emitting element of the light source 36 emits light L toward the central portion of the light transmissive element 32. The integrated light directing device 48 receives the light L from the light emitting element and directs the light through the central portion of the light transmissive element 32 toward the illuminated surface 40. According to an exemplary embodiment, the light directing device 48 includes a substantially conical protrusion 62 extending from the bottom of the central portion and configured to substantially collimate the light L from the light source 36. The light directing device 48 also includes angled surface(s) 63 configured to direct (e.g., reflect) the collimated light L outwardly through the central portion of the light transmissive element 32 in the radial direction. According to an exemplary embodiment, the light transmissive element 32 includes respective angled surface(s) 66 configured to reflect the light L upwardly in the vertical direction, thereby directing the light L toward the illuminated surface 40. As previously discussed, the illuminated surface 40 is configured to direct the light L toward the interior of the receptacle, thereby enhancing the visibility of the cup holder assembly 20 in low light conditions (e.g., while driving at night). In addition, because the surface 40 is illuminated by a single centrally-located light source 36, the luminous intensity of the surface 40 may be substantially uniform. As a result, the aesthetic appearance of the cup holder may be enhanced.

According to an exemplary embodiment, the light directing device 48 includes a continuous angled surface 63 (e.g., forming a conical surface) to direct light substantially evenly along the annual illuminated surface 40. According to an exemplary embodiment, the light directing device 48 may include multiple discrete surfaces 63 configured to direct light toward separated arcuate portions of the annular surface 40. For example, the light directing device 48 may include three angled surfaces 63 (e.g., forming a pyramidal structure) to direct light to three respective arcuate portions of the annular surface 40, thereby establishing a pattern of illuminated arcuate sections along the surface 40. According to an exemplary embodiment, the light directing device 48 may include two, four, five, six, seven, eight, or more angled surfaces 63. In addition, the central portion of the light transmissive element 32 may be substantially continuous (e.g., annular and extending radially outward from the light directing device 48 to the illuminated surface 40) or divided into multiple segments. For example, each angled surface 63 may be optically coupled to a corresponding portion of the annular surface 40 by a respective segment of the central portion. According to an exemplary embodiment, the annular surface 40 may be divided into multiple discrete segments (e.g., each associated with a respective angled surface 66) configured to receive light from the respective segments of the central portion and the respective angled surfaces 63, 66.

According to an exemplary embodiment, the surface 40 of the light transmissive element 32 may be coated with a reflective material to enhance visibility of the receptacle in daylight conditions. For example, the light transmissive element 32 may include a chrome coating over the illuminated surface. Such a coating may be configured to facilitate light passage from the light transmissive element, thereby maintaining visibility of the receptacle in low light conditions. It should also be appreciated that alternative light transmissive colored and/or textured coatings may be applied to enhance the appearance of the cup holder assembly 20. In addition, it should be appreciated that the light transmissive element 32 may be tinted to provide a desired illuminated color. For example, if blue light is desired and white light is emitted from the light source, the light transmissive element 32 may be tinted blue to provide the desired appearance. According to an exemplary embodiment, the light transmissive element 32 may be tinted the same color as the cup holder body to enhance the appearance of the cup holder assembly.

According to an exemplary embodiment, the light transmissive element 32 is coupled to the cup holder body to form the receptacle. According to an exemplary embodiment, the angled surface(s) 66 of the light transmissive element 32 include protrusion(s) 72 configured to contact a bottom surface of the cup holder body to block movement of the light transmissive element 32 in the vertical direction. For example, during the manufacturing process, the light transmissive element 32 may be inserted through the central opening 28 of the receptacle until the angled surface(s) 66 contact the cup holder body. Further downward movement in the vertical direction drives the opening 28 to expand via contact between the angled surface(s) 66 and the peripheral wall 26, thereby enabling the light transmissive element to be inserted into an installed position. Once inserted, contact between the protrusion(s) 72 and the bottom surface secures the light transmissive element 32 to the cup holder body. According to an exemplary embodiment, the light transmissive element 32 may be secured to the cup holder by an adhesive connection, by fasteners, or by other suitable mounting devices.

As previously discussed, the cup holder assembly 20 includes a shield configured to block at least a portion of the light from the central portion into the receptacle. According to an exemplary embodiment, the shield is secured to the top of the central portion of the light transmissive element 32. According to an exemplary embodiment, the shield includes a protrusion 76 configured to interface with a recess 78 within the light transmissive element 32. Contact between the protrusion 76 and the recess 78 blocks movement of the shield in the vertical direction. In addition, contact between an outer edge of the shield and an inner edge of the light transmissive element 32 blocks radial movement of the shield. With the shield in the desired position, a substantially annular lit ring, which extends about the base of the receptacle, is established.

While the lighting system (e.g., light source, light transmissive element, etc.) is described with reference to a cup holder assembly, it should be appreciated that the lighting system may be employed within other retaining assemblies of the vehicle interior. For example, the vehicle may include a receptacle configured to retain a portable electronic device. In such a configuration, the lighting system may be configured to emit light from a light transmissive element at the base of the receptacle to facilitate identification of the receptacle in low light conditions.

Figure 5A:
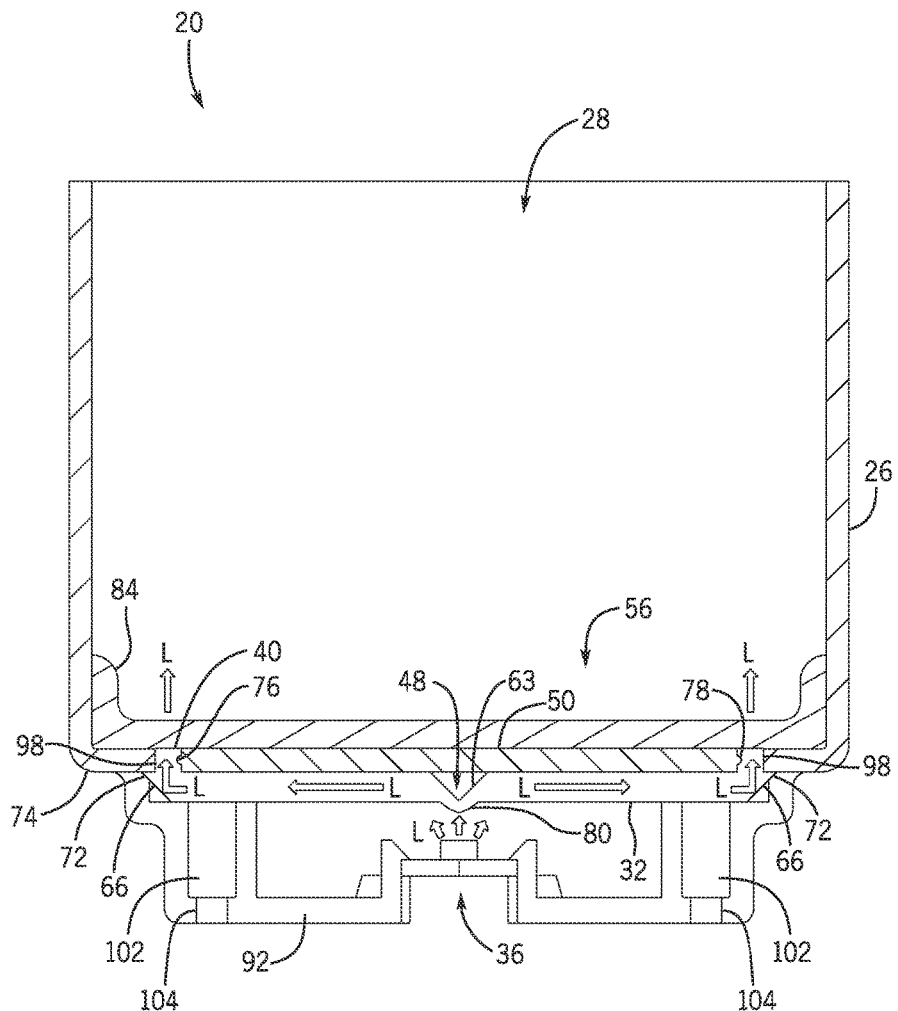
FIGS. 5A-5C are cross-sectional views of another embodiment of a cup holder assembly having a lighting system.
Figure 5B:
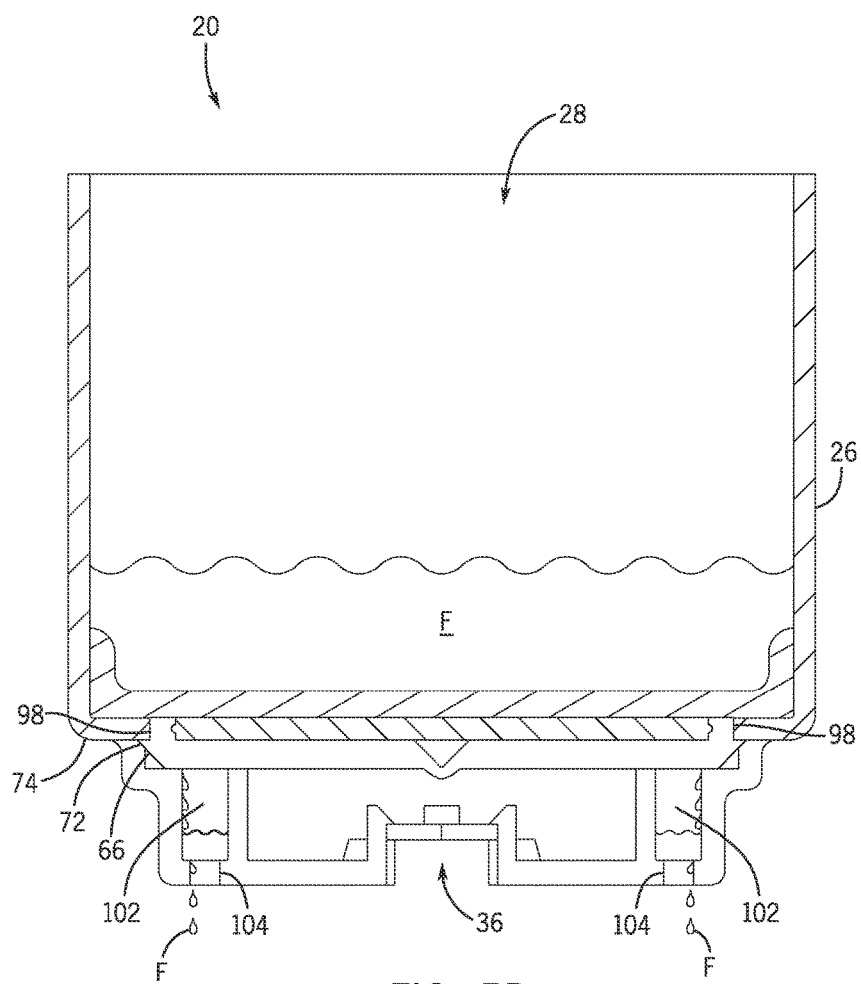
Figure 5C:
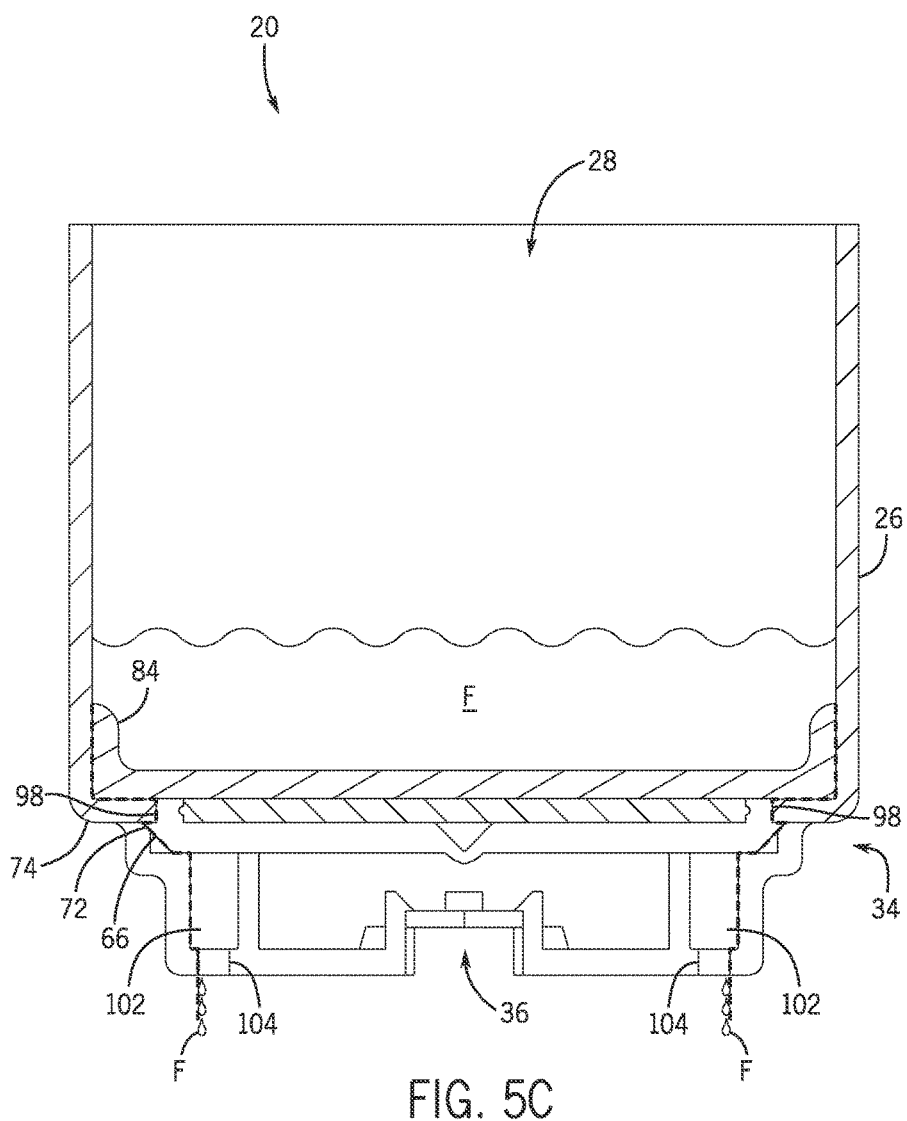

FIGS. 5A-5C are cross-sectional views of another embodiment of a cup holder assembly having a lighting system. As previously discussed, the light emitting element is configured to emit light L toward the central portion of the light transmissive element 32. The integrated light directing device 48 receives the light L from the light emitting element and directs the light through the central portion of the light transmissive element 32 toward the illuminated surface 40. According to an exemplary embodiment, the light directing device 48 includes a lens 80 configured to substantially collimate the light L from the light emitting element. The light directing device 48 also includes angled surface(s) 63 configured to direct (e.g., reflect) the collimated light L outwardly through the central portion of the light transmissive element 32 in the radial direction. The respective angled surface(s) 66 are configured to reflect the light L upwardly in the vertical direction, thereby directing the light L toward the illuminated surface 40. As previously discussed, the illuminated surface 40 is configured to direct light toward the interior of the receptacle, thereby enhancing the visibility of the cup holder assembly 20 in low light conditions (e.g., while driving at night). In addition, because the surface 40 is illuminated by a single centrally-located light source 36, the luminous intensity of the surface 40 may be substantially uniform. As a result, the aesthetic appearance of the cup holder may be enhanced.

According to an exemplary embodiment, the cup holder assembly 20 includes a liner 84 disposed within the receptacle. The liner 84 is configured to retain a beverage container during operation of the vehicle and/or to block liquid flow from the beverage container into the receptacle. According to an exemplary embodiment, the cup holder liner 84 is formed from a thermoplastic elastomer (TPE) (e.g., polyolefin). As will be appreciated, the hardness of the cup holder liner 84 may be characterized by the resistance to indentation, otherwise referred to as Durometer, denoted in the Shore A scale, for example. Within the Durometer scale, materials are generally characterized based on ranges. Hard elastomers generally include those having a Durometer greater than about 80 Shore A, soft elastomers generally include those having a Durometer of about 60 Shore A to about 80 Shore A, and super-soft elastomers generally include those having a Durometer below about 60 Shore A. According to an exemplary embodiment, the cup holder liner 84 may be composed of a material having a Durometer of approximately between 70 to 80 Shore A. According to an exemplary embodiment, the liner 84 may be formed from a substantially rigid material, such as polycarbonate (PC), acrylonitrile butadiene styrene (ABS), poly(methyl methacrylate) (PMMA), among other materials.

According to an exemplary embodiment, the liner 84 is formed from a light transmissive material configured to receive light from the illuminated surface 40, which is positioned outwardly from an outer surface of the liner, and to illuminate an inner surface of the liner 84. Accordingly, the liner enables light L from the illuminated surface 40 to pass through the liner 84, thereby illuminating the interior of the receptacle. The illuminated liner may enhance the visibility of the cup holder assembly in low light conditions (e.g., while driving at night). In addition, the liner may conceal the lighting system until activated, thereby enhancing the aesthetic appearance of the cup holder assembly (e.g., while the lighting system is not activated). For example, the liner 84 may appear to be formed from a substantially opaque material (e.g., appear substantially opaque) until the liner 84 is illuminated by the light emitting element/light transmissive element 32. According to an exemplary embodiment, the liner 84 may be formed from a material that appears transparent or translucent while the lighting system is not activated. According to an exemplary embodiment, the liner 84 may include a light transmissive portion (e.g., a transparent or translucent portion) substantially aligned with the illuminated surface 40 (e.g., forming a ring proximate to the peripheral wall 26 of the cup holder body).

According to an exemplary embodiment, the light transmissive material is configured to reduce an intensity of the light L without substantially varying a color of the light. Such a material may be considered a neutral density material. According to an exemplary embodiment, the light transmissive material may be configured to tint the light to a desired color. For example, the illuminated surface may be configured to emit white light, and the liner material may be configured to tint the light to a color that matches and/or complements the color of the surrounding structure. While the illustrated liner is illuminated by a light transmissive element at the base of the receptacle, it should be appreciate that the liner 84 may be illuminated by other light sources (e.g., light guides, light emitting elements, etc.) distributed throughout the receptacle to provide a desired lighting effect.

The illustrated cup holder assembly 20 also includes a drain system configured to direct liquid away from electronic components positioned beneath the cup holder. As previously discussed, the cup holder assembly 20 includes a cup holder body having a peripheral wall 26 that extends about the central opening 28 of the receptacle. In addition, the cup holder assembly 20 includes a light transmissive element 32 disposed within the central opening 28 and forming the base of the receptacle. According to an exemplary embodiment, the cup holder assembly 20 also includes a substrate 92 configured to support the cup holder body and the light transmissive element 32. The substrate 92 includes a central section proximate to the light transmissive element 32. The substrate 92 also includes a drain system configured to direct a liquid flow from an interface 98 between the cup holder body and the light transmissive element 32 to a region remote from the central section. According to an exemplary embodiment, the drain system includes a channel 102 extending about the central section of the substrate 92. The channel 102 is configured to receive the liquid flow from the interface 98. The drain system also includes at least one drain port 104 configured to direct the liquid flow from the channel 102 to the region remote from the central section of the substrate 92.

By way of example, liquid F from a beverage container within the cup holder assembly 20 (e.g., condensation, spillage, etc.) may collect at the base of the receptacle, as shown in FIG. 5B. The liquid F may then leak through the interface 98 between the cup holder body and the light transmissive element 32, as shown in FIG. 5C. The drain system directs the liquid F from the interface 98 to the region remote from the central section of the substrate 92. For example, the liquid F may flow from the interface 98 to the channel 102 and then drain from the channel 102 through one or more drain ports 104. Because the drain system is configured to direct the liquid F away from the central section of the substrate 92, the longevity of electronic components (e.g., the light emitting element, the circuit assembly, etc.) disposed within the central section may be enhanced. According to an exemplary embodiment, the flow path for liquid F from the body of the receptacle through the drain system under the base 34 with interface 98 and channel 102 and drain port 104 channeled to protect electronic components such as light source 36 is shown schematically by a broken line in FIG. 5C. According to an exemplary embodiment, the drain system may be employed in alternative cup holder assemblies having other support structures (e.g., formed from a substantially opaque material) at the base of the receptacle.

Figure 6:
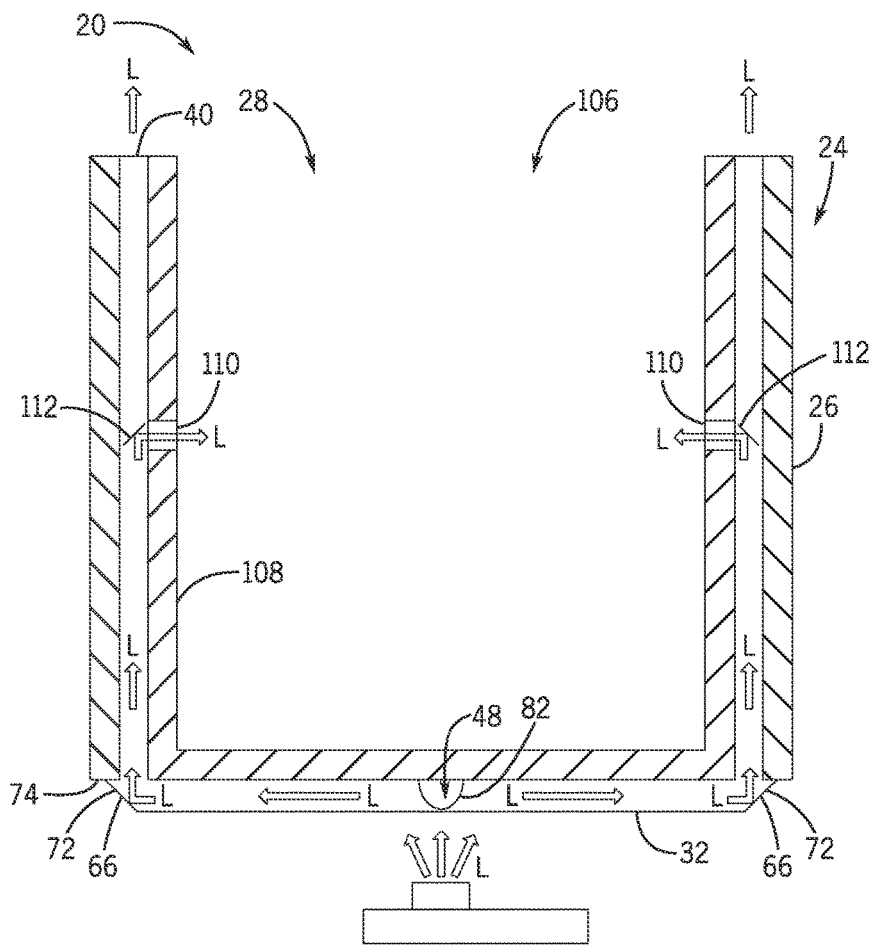
FIG. 6 is a cross-sectional view of a further embodiment of a cup holder assembly having a lighting system.

FIG. 6 is a cross-sectional view of a further embodiment of a cup holder assembly having a lighting system. According to an exemplary embodiment, the light transmissive element 32 extends to an inlet 106 of the receptacle. Accordingly, the illuminated surface 40 forms a ring (e.g., a substantially annular ring) about the inlet 106. As a result, the visibility of the cup holder may be enhanced, especially in low light conditions (e.g., while driving at night). According to an exemplary embodiment, the cup holder assembly 20 includes a liner (e.g., wall) 108 that extends in the vertical direction from the base to the inlet 106. As previously discussed, the cup holder liner 108 is configured to block movement of a beverage container via frictional contact with an outer surface of the beverage container. The cup holder liner 108 may also substantially block liquid flow from the beverage container into the receptacle. According to an exemplary embodiment, the liner 108 includes a light transmissive portion 110 configured to facilitate light passage from the outer surface of the liner 108 to the inner surface of the liner 108. According to an exemplary embodiment, the light transmissive element 32 includes an integrated light redirecting device 112 configured to direct at least a portion of the light L through the light transmissive portion 110 of the liner 108. Accordingly, the light L is emitted from the inner surface of the liner 108 to facilitate identification of the cup holder assembly in low light conditions. According to an exemplary embodiment, the liner 108 may include additional light transmissive portions. Furthermore, it should be appreciated that the shape, color, arrangement, and/or number of light transmissive portions may be particularly selected to provide a desired lighting effect, thereby enhancing the aesthetic appearance of the cup holder assembly.

According to an exemplary embodiment, the light directing device 48 includes curved surface(s) 82 (e.g., parabolic, hyperbolic, etc.) configured to substantially collimate the light L from the light emitting element and to direct (e.g., reflect) the collimated light L outwardly through the central portion of the light transmissive element 32 in the radial direction. Utilizing the curved surface(s) 82 may obviate the conical protrusion 62/lens 80, thereby reducing the complexity of the light transmissive element 32. The light directing device 48 may include a continuous curved surface 82 to direct light radially outward toward an annular illuminated surface, or the light directing device 48 may include multiple curved surfaces to direct light toward respective illuminated portions (e.g., separated arcuate portions of the annular surface).

Figure 7:
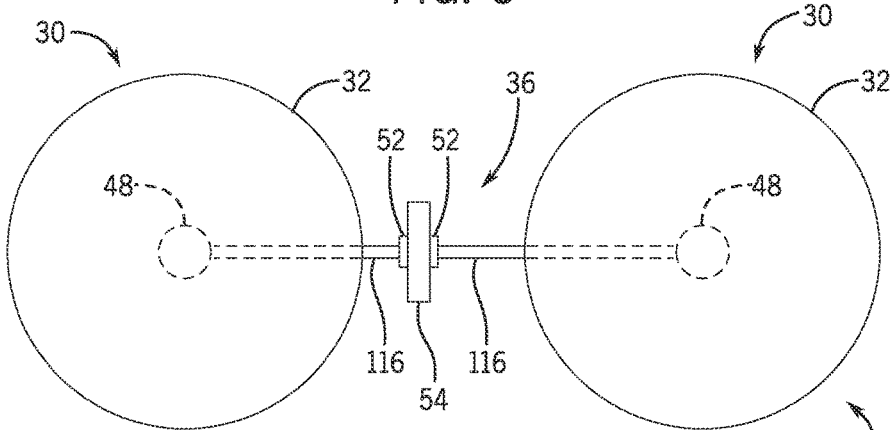
FIG. 7 is a top view of an embodiment of a cup holder assembly having a lighting system.

FIG. 7 is a top view of an embodiment of a cup holder assembly having a lighting system. According to an exemplary embodiment, the lighting system is configured to illuminate two receptacles 30 with a single light source. According to an exemplary embodiment, the light source 36 includes a circuit assembly 54 having two light emitting elements 52. The light source 36 also includes a pair of light guides 116 (e.g., fiber optic cables, solid light guides, etc.) configured to direct the light from each light emitting element 52 to a respective light transmissive element 32. Each light transmissive element 32 is configured to illuminate a corresponding receptacle to enhance the visibility of the cup holder assembly in low light conditions (e.g., while driving at night). Because a single light source is used to illuminate two receptacles, the cost of the cup holder assembly may be reduced, as compared to configurations that utilize independent light sources to illuminate each receptacle. According to an exemplary embodiment, the light source 36 may be utilized to illuminate 3, 4, 5, 6, or more receptacles. In addition, it should be appreciated that a single light emitting element 52 may be utilized to illuminate multiple light transmissive elements 32 via respective light guides 116.

According to an exemplary embodiment, a cup holder assembly includes a cup holder body having a peripheral wall extending at least partially about a central opening of a receptacle. The cup holder assembly also includes a light transmissive element disposed within the central opening and forming a base of the receptacle. The light transmissive element is configured to receive light from a light source positioned proximate to a central portion of the light transmissive element, and to illuminate a surface of the light transmissive element proximate to the peripheral wall.

Accordingly to an exemplary embodiment, a cup holder assembly includes a cup holder body having a peripheral wall extending at least partially about a central opening of a receptacle. The cup holder assembly also includes a support element disposed within the central opening and forming a base of the receptacle. In addition, the cup holder assembly includes a substrate configured to support the cup holder body and the support element. The substrate includes a central section proximate to the support element and a drain system configured to direct a liquid flow from an interface between the cup holder body and the support element to a region remote from the central section.

Accordingly to an exemplary embodiment, a cup holder assembly includes a receptacle configured to receive a beverage container. The cup holder assembly also includes a liner disposed within the receptacle. The liner is formed from a light transmissive material configured to receive light from a light source positioned outwardly from an outer surface of the liner, and to illuminate an inner surface of the liner.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A cup holder assembly providing a receptacle configured to be illuminated by light from a light source comprising:
    a structure comprising (a) a top with an opening; and (b) a base configured for the light source; and (c) an outlet for light configured to provide illumination for the receptacle;
    a device configured to direct light from the light source to the outlet;
    wherein the outlet is between the base of the structure and the top of the structure and configured to be at least partially illuminated by light from the light source;
    wherein the structure comprises an inner wall and an outer wall configured for light from the light source to travel from the base and between the inner wall and outer wall to the device at the outlet;
    wherein the device comprises a surface positioned between the inner wall and the outer wall at the outlet configured to direct light from the light source to provide illumination for the receptacle.

2. The cup holder assembly of claim 1 wherein the structure comprises a wall with the outlet and the outlet comprises at least one of (1) a slot; (2) a window; (3) a ring; (4) a light transmissive element.

3. The cup holder assembly of claim 1 wherein the device configured to direct light comprises at least one of (1) an angled surface; (2) a reflector; (3) a deflector; (4) a light guide; (5) a light directing device; (6) a light redirecting device; (7) a light redirecting device integrated with a light transmissive element.

4. The cup holder assembly of claim 1 further comprising a guide to transmit light from the light source to the device configured to direct light to the outlet.

5. The cup holder assembly of claim 4 wherein the guide comprises at least one of (1) a guide along the base; (2) a guide along a wall of the structure; (3) the device configured to direct light.

6. The cup holder assembly of claim 4 wherein the guide comprises at least one of (1) glass material; (2) plastic material; (3) polycarbonate material; (4) acrylic material; (5) a passage along a wall of the structure; (6) a passage between an inner wall and an outer wall of the structure.

7. The cup holder assembly of claim 1 wherein the structure comprises an inner wall and an outer wall configured so that light from the light source will travel between the inner wall and the outer wall to the outlet.

8. The cup holder assembly of claim 7 wherein the structure comprises a bottom at the base; and wherein the light source is at the bottom and the structure is configured so that light from the light source will travel between the inner wall and the outer wall from the bottom toward the top.

9. The cup holder assembly of claim 1 further comprising a top outlet for light adjacent to the top of the structure so that light from the light source illuminates the top of the structure at the top outlet.

10. The cup holder assembly of claim 1 wherein the device and the outlet are configured so that light provided at the outlet at least partially illuminates the opening.

11. A cup holder assembly providing a receptacle configured to be illuminated by light from a light source comprising:
a structure comprising (a) a top with an opening; (b) a base configured for the light source; (c) a wall structure between the top and a bottom provided at the base comprising an outer wall and an inner wall for the receptacle; and (d) an outlet for light configured to provide illumination;
wherein the outlet comprises (1) a top outlet at the top of the structure configured so that light from the light source at the base illuminates the top of the structure at the top outlet and (2) an interior outlet formed in the inner wall of the wall structure between the base of the structure and the top of the structure configured so that light from the light source at the base illuminates at least a portion of the receptacle.

12. The cup holder assembly of claim 11 further comprising a guide for light between the light source and the outlet; wherein the guide comprises at least one of (1) a guide along the base; (2) a guide along a wall of the structure; (3) a device configured to direct light; (d) a guide between the inner wall and the outer wall of the wall structure.

13. The cup holder assembly of claim 12 wherein the guide comprises at least one of (1) glass material; (2) plastic material; (3) polycarbonate material; (4) acrylic material; (5) a passage along a wall of the structure; (6) a passage between an inner wall and an outer wall of the structure.

14. The cup holder assembly of claim 11 wherein the structure comprises an inner wall and an outer wall configured so that light from the light source will travel between the inner wall and the outer wall to the outlet; wherein the structure comprises a bottom at the base; and wherein the light source is at the bottom and the structure is configured so that light from the light source will travel between the inner wall and the outer wall from the bottom toward the top.

15. The cup holder assembly of claim 11 wherein the top outlet comprises a peripheral ring configured to at least partially illuminate the top of the structure.

16. The cup holder assembly of claim 11 further comprising an interior outlet between the top of the structure and the base of the structure and configured to be at least partially illuminated by light from the light source.

17. A cup holder assembly providing a receptacle configured to be illuminated by light from a light source comprising:
a structure comprising (a) a top with an opening; (b) a bottom; (c) a wall structure between the top and the bottom comprising an outer wall and an inner wall for the receptacle; (d) an interior outlet for the inner wall of the structure between the top of the structure and the bottom of the structure and configured to be at least partially illuminated by light from the light source; and (e) a top outlet adjacent to the top of the structure configured to be at least partially illuminated by light from the light source;
wherein the wall structure is configured so that light from the light source travels between the inner wall and the outer wall to the interior outlet and to the top outlet.

18. The cup holder assembly of claim 17 further comprising a base at the bottom of the structure configured for the light source.

19. The cup holder assembly of claim 17 wherein the structure comprises a wall from the bottom of the structure to the top of the structure; wherein the interior outlet comprises at least one of (1) a slot in the wall; (2) a window in the wall; (3) a ring; (4) a light transmissive element; and wherein the top outlet comprises at least one of (1) a ring at the top of the wall; (2) a ring at the periphery of the wall; (3) a light transmissive element at the top of the wall; (4) a light transmissive element at the periphery of the wall; (5) a surface of a liner comprising a light transmissive material along the wall.

20. The cup holder assembly of claim 17 further comprising a guide for light along a wall of the structure between the light source and the outlet; and wherein the guide comprises at least one of (1) glass material; (2) plastic material; (3) polycarbonate material; (4) acrylic material; (5) a passage along the wall of the structure; (6) a passage between an inner wall and an outer wall of the structure; (7) a liner configured to transmit light to the top outlet.

* * * * *